Dec. 24, 1968  F. W. MEADOWS ET AL  3,418,412
MANUFACTURE OF POTTERY WARE
Original Filed July 6, 1965                        5 Sheets-Sheet 1

Dec. 24, 1968  F. W. MEADOWS ET AL  3,418,412
MANUFACTURE OF POTTERY WARE
Original Filed July 6, 1965  5 Sheets-Sheet 4

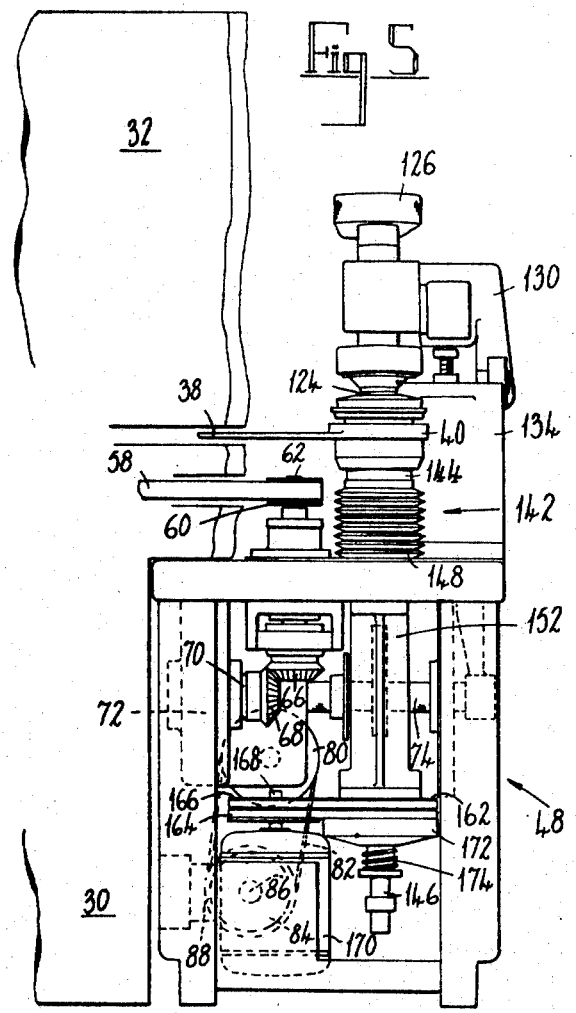

3,418,412
MANUFACTURE OF POTTERY WARE
Frank William Meadows and Dennis Podmore, Stoke-on-Trent, England, assignors to Service (Engineers) Limited, Cobridge, Stoke-on-Trent, England, a British company
Continuation of application Ser. No. 469,548, July 6, 1965. This application Feb. 14, 1967, Ser. No. 616,129
Claims priority, application Great Britain, July 9, 1964, 28,282/64
19 Claims. (Cl. 264—319)

This application is a continuation of application Ser. No. 469,548, filed July 6, 1965, and now abandoned.

This invention is concerned with apparatus for use in the manufacture of pottery ware.

In the pottery industry it is customary for hollow ware (i.e., cups and the like) to be made in a mould, usually by means of a making machine, and thereafter to be dried out to a so-called leather condition. Drying apparatus provided for this purpose generally comprises a relatively large drying chamber maintained at an elevated temperature, e.g., by means of gas burners, and a plurality of shelves mounted on a conveyor which move either intermittently or continuously through the chamber. Each shelf comprises a plurality of mould supports, access to the shelves from outside for loading and unloading purposes being afforded by an aperture, or sometimes two apertures, in the wall of the chamber.

Making moulds in which the ware is formed are generally of a fragile nature, being made of plaster of Paris, and are liable to break if subjected to temperatures exceeding 160° F. Consequently, in order to dry out ware to a leather condition while avoiding overheating of the moulds it has been necessary to keep the ware in the drying chamber for comparatively long periods, viz 20 to 25 minutes. The disadvantages of so long a drying time are not only that a relatively large drying chamber is required but also that a large number of moulds is thus kept in use at any one time and thus a large number of moulds is required in the making of the ware.

It is one of the various object of the present invention to provide an improved apparatus suitable for use in the manufacture of pottery ware by means of which articles of pottery ware can be dried out to a leather condition comparatively quickly with little or no shortening of the effective life of moulds passing therethrough.

There is hereinafter described, to illustrate the invention by way of example, one form of apparatus in accordance with the invention, this apparatus, which is an apparatus for drying articles of pottery hollow ware in the manufacture thereof, comprising conveyor means in the form of a turntable about the periphery of which is mounted a plurality of mould supports, a plurality of nozzles mounted at spaced apart intervals above the mould supports along a portion of the path of thte conveyor means and arranged to direct hot air centrally on to a surface of articles of pottery ware supported, in moulds, by the mould supports, a shelf member mounted above the mould supports and provided with a plurality of apertures, one associated with each of the nozzles, means, including a fan, whereby hot air is impelled through the nozzles, is caused to impinge on the surface of the articles and is then drawn off through the apertures provided in the shelf member, and means, including a Geneva mechanism, for moving the conveyor means intermittently to bring each mould support beneath each of the nozzles in turn.

The apparatus is provided with a drying cabinet having two interior shelf members (one of which is referred to above) defining three chambers within the cabinet. A first, uppermost, one of these chambers has a base portion along which the plurality of nozzles referred to above are mounted at spaced apart intervals and a second, intermediate, one also has a base portion, constituted by the shelf member referred to above, in which is provided the plurality of apertures referred to above, one associated with each of the nozzles. Through the third, lowermost, one of the three chambers the conveyor means is arranged to move the mould supports mounted thereon.

Each nozzle of the apparatus is arranged to project from the base of the first chamber, through the second chamber and its associated aperture, and into the third chamber, the aperture, which is of substantially greater cross section than the cross section of the nozzle, being provided with a depending tubular skirt portion surrounding a portion of the nozzle, which is cylindrical, and the nozzle and skirt portion being arranged coaxially one with the other.

The apparatus also comprises an air heater arrangement in the form of a gas burner past which air is impelled by the fan prior to it being impelled through the nozzles as aforesaid. The fan is, further, provided with a fan housing an outlet aperture of which is connected with the first chamber of the drying cabinet and an intake aperture of which is connected with the second chamber.

The drying cabinet is arranged in two sections, viz a hot air section in which the nozzles, apertures, air heater arrangement and fan referred to above are provided, and a cold air section in which a plurality of nozzles mounted at spaced apart intervals above the mould supports along another portion of the path of the conveyor means are arranged to direct cold air centrally on to the surface of the articles, the mould supports being moved intermittently through the cold air section by the conveyor means subsequent to their having been moved through the hot air section thereby. The cold air section of the drying cabinet is also provided with means, including a second fan, whereby cold air is impelled through the nozzles and is caused to impinge on the surface of the articles.

The apparatus is further provided with a making machine disposed at a making station of the apparatus to which moulds supported by the mould supports are moved in turn and from which they are moved into the drying cabinet of the apparatus. The making machine comprises a rotatable chuck, means for rotating the chuck, a forming tool in the form of a roller adapted to be heated, means for rotating the roller forming tool, and means for lowering and raising the forming tool relative to the chuck, i.e., moving the forming tool into and out of operative position. In the operation of this making machine, a mould supported by a mould support is raised out of its support by the chuck, which is mounted for heightwise movement, the chuck is then rotated and the roller forming tool, which rotates continuously at a slower speed than that of the chuck, lowered to enter the mould and form a portion of clay previously placed in the mould into the desired shape.

The apparatus is also provided with a clay feeding device disposed at a clay feeding station of the apparatus to which moulds supported by the mould supports are moved in turn and from which they are moved to the making station of the apparatus. This clay feeding device may be of any suitable construction capable of feeding a desired amount of clay at a desired rate.

Conveniently in the operation of the apparatus, an amount of clay is first placed in a mould supported on a support mounted on the conveyor means and thereafter, upon the operation of the conveyor means, the mould is brought to the making machine where the article of hollow ware is formed. The mould then passes into the hot air section of the drying cabinet and is positioned successively beneath each of the nozzles in that section through each of which hot air is directed on to the article formed therein, the period of dwell beneath each nozzle being approximately 2¼ seconds. Thereafter the mould passes into the cold air section, in which the article therein is cooled sufficiently to enable it to be handled, and is then carried out of the drying cabinet, the article being then removed from the mould leaving the latter available for another making and drying operation.

In using the apparatus articles of pottery hollow ware can be made and dried comparatively quickly and yet without overheating the moulds in which the articles are made. In addition it will be apparent that a smaller number of moulds is required than has previously been necessary.

There now follows a detailed description, to be read with reference to the accompanying drawings, of the apparatus and its method of use. It will of course be realised that this apparatus has been selected for description merely by way of exemplification of the invention and not by way of limitation thereof.

In the accompanying drawings:

FIGURE 5 is a view of the making machine from the direction of the arrow V in FIGURE 4.

Figure 1:
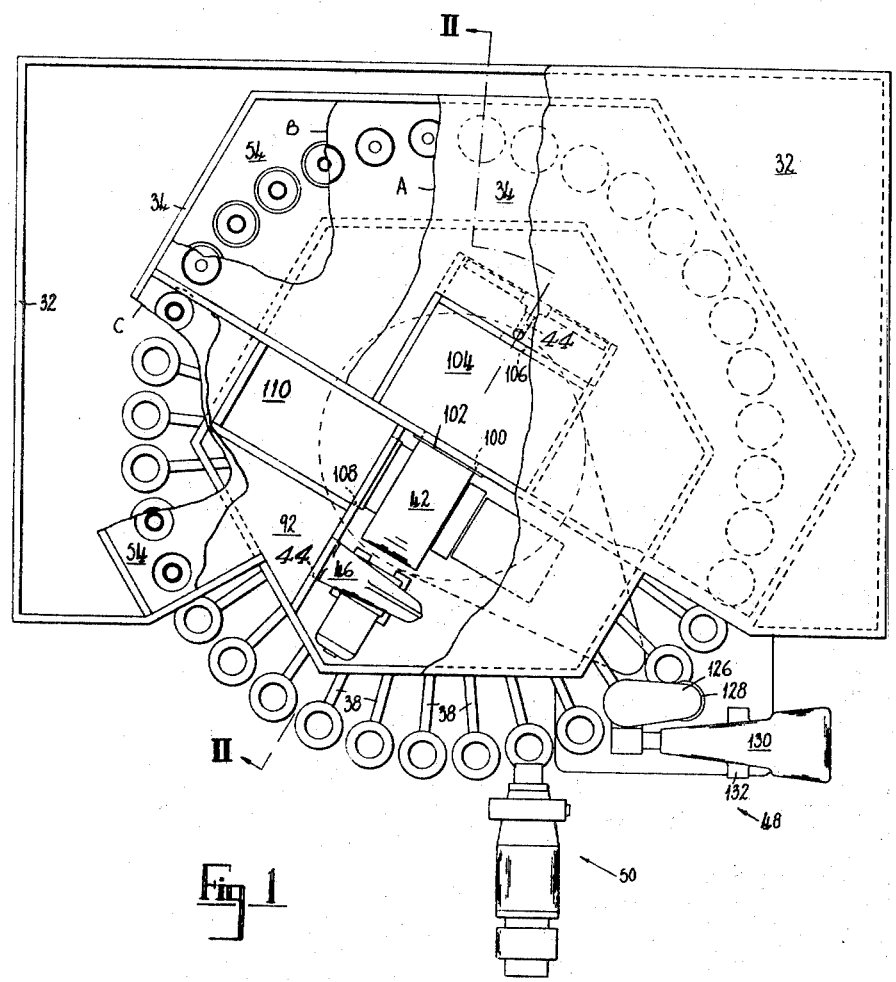
FIGURE 1 is a plan view, with parts broken away, of the apparatus showing a turntable, a making machine and a clay feeding device arranged at stations about the periphery of the turntable, and air heating means, including a fan and gas burner.

The apparatus, which is an apparatus suitable for use in the manufacture of articles of pottery hollow ware, comprises (i) a base 30 on which a box-like cover structure 32 is supported, (ii) a drying cabinet 34 which is generally hexagonal viewed in plan (see FIGURE 1) and which is divided into three superposed chambers designated A, B and C, (iii) a turntable 36 provided with thirty six radially mounted arms 38 equally spaced apart about the periphery and each having formed integrally with the outward end thereof an annulus constituting a mould support 40, the turntable being disposed within the lowermost chamber C of the drying cabinet 34, (iv) air heating means including a first fan 42 arranged to impel air past a gas burner 44 into the uppermost chamber A of the drying cabinet 34 and to draw air from the intermediate chamber B thereof, the fan 42 and gas burner 44 being arranged centrally of the drying cabinet, (v) means including a second fan 46 also mounted centrally of the drying cabinet 34 and arranged to impel cold air on to articles of ware prior to removal thereof from their moulds, (vi) a making machine generally designated 48 secured to the base 30 at a making station of the turntable 36, and (vii) a clay feeding device generally designated 50 arranged at a clay feeding station of the turntable 36.

Figure 2:
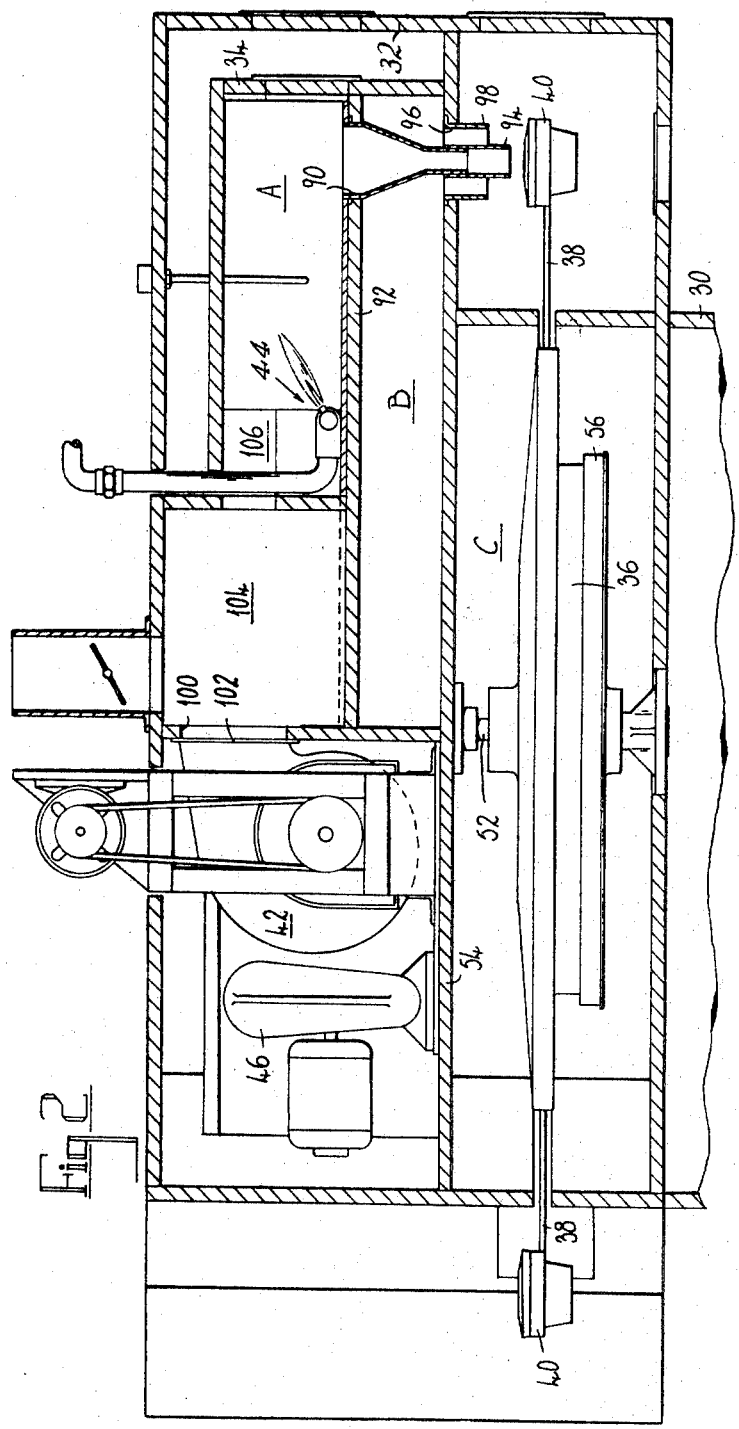
FIGURE 2 is a sectional view of the apparatus along the line II—II of FIGURE 1.
Figure 3:
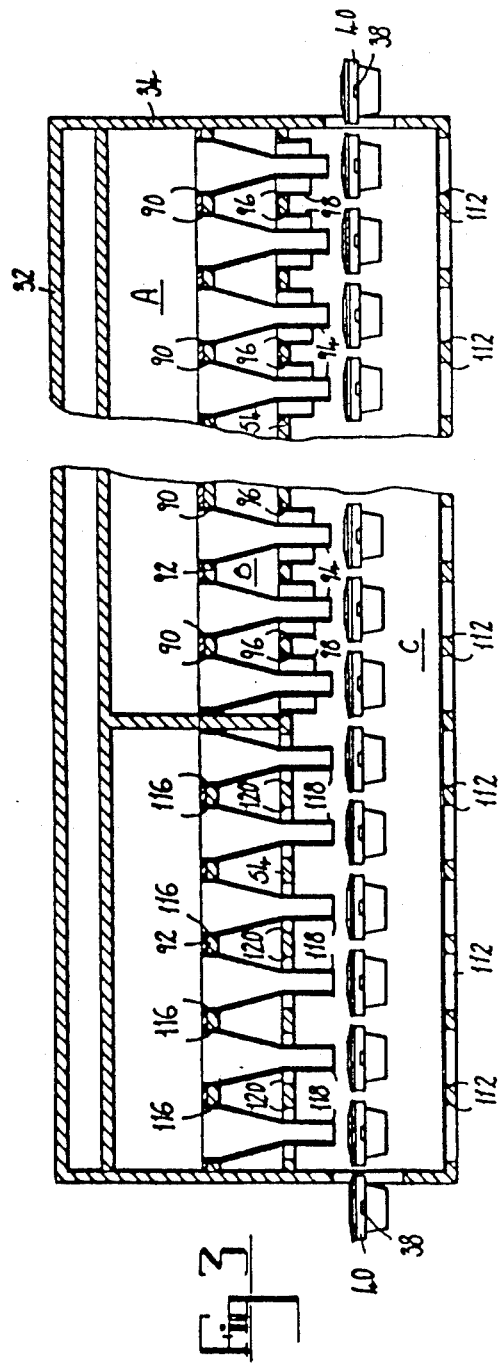
FIGURE 3 is a sectional view through a drying cabinet of the apparatus.

The turntable 36 is mounted for intermittent rotational movement on a vertical shaft 52 (FIGURE 2) supported between a floor section of the box-like structure 32 and a ceiling member 54 of the lowermost chamber C of the drying cabinet 34, the shaft being provided with a pulley 56 operatively connected by a belt 58 to a driving pulley 60 (FIGURE 5) supported on a vertical spindle 62 in a frame 64 of the making machine 48. Mounted at the lower end of the spindle 62 is a bevel gear 66 arranged to mesh with a bevel gear 68 supported on a horizontal shaft 70 which is caused to rotate intermittently by a Geneva mechanism (not shown) accommodated in a housing 72 secured on the frame 64 of the making machine and driven from a main cam shaft 74 of the making machine. The Geneva mechanism and the ratio between the pulleys 56, 60 are so arranged that the turntable is caused to move through a distance equal to the distance between adjacent mould supports once in each cycle of operation of the apparatus.

The main cam shaft 74 of the making machine 48 is driven through a reduction gear box 76 on the input shaft 78 of which is mounted a pulley 80 connected by a belt 82 to a variable speed cone pulley 84 mounted on a drive shaft 86 of an electric motor 88 supported on the frame 64 of the making machine.

The drying cabinet 34 extends to embrace twenty four stations of the turntable, eighteen of these twenty four stations being arranged in a hot air section of the drying cabinet and the remainder in a cold air section thereof. In the hot air section of the drying cabinet the uppermost chamber A is provided with eighteen apertures 90 formed, at spaced apart intervals in a semi-circle to coincide with eighteen stations of the turntable 36, in a base portion 92 which also constitutes the ceiling member of the intermediate chamber B. Each aperture 90 has depending therefrom a nozzle 94 which extends through the chamber B, through an aperture 96 formed in the base portion thereof, constituted by the ceiling member 54 of the lowermost chamber C, and into the lowermost chamber C. The apertures formed in the base portion of the intermediate chamber B are each provided with a depending tubular skirt 98 which surrounds the lower end portion of its associated nozzle 94 and extends into the lowermost chamber C, though not so far as the nozzle itself.

The uppermost chamber A of the drying cabinet 34 is connected to an outlet aperture 100 (FIGURES 1 and 2) of a housing 102 of the first fan 42, through which aperture air is impelled through a sub-chamber 104, the base portion of which is constituted by an extension of the base portion 92 of the uppermost chamber, and through a passage 106 past the gas burner 44 into the uppermost chamber A, from where it is directed downwardly through the nozzles 94. The intermediate chamber B is connected to an intake aperture 108 (FIGURE 1) of the first fan 42 through a sub-chamber 110 the base portion of which is constituted by an extension of the base portion of the intermediate chamber, air thus being drawn from the lowermost chamber C through the skirts 98.

In the operation of the apparatus, air is impelled by the first fan 42 past the gas burner 44 and is heated thereby before it passes into the uppermost chamber A from which it is directed downwardly through the nozzles 94 and caused to impinge on articles of hollow ware supported in their moulds M by the mould supports 40 of the turntable therebeneath, the air being directed into the articles centrally thereof. At the same time hot air is escaping out of the articles and this hot air, together with cold air drawn from the lowermost chamber C in which the mould supports are arranged, is drawn through the skirts 98 and returns to the first fan 42 to be recirculated. The base of the drying cabinet 34, constituted by a section of the box-like structure 32, is provided with a series of apertures 112 arranged coincident with the twenty four stations referred to above through which air can be drawn from outside.

In the cold air section of the drying cabinet 34 the uppermost chamber A is connected with an outlet aperture 114 of the second fan 46, the chamber being provided, in the base portion 92 thereof, with six apertures 116 from each of which depends a nozzle 118 extending through the intermediate chamber B and through an aperture 120 formed in the base portion thereof into the lowermost chamber C. Unlike the apertures 96 of the hot air section, the apertures 120 are not provided with depending tubular skirts, nor is the intermediate chamber B connected to an intake aperture of the second fan which is instead arranged to draw cold air from the atmosphere, while the air directed through the nozzles 118 into articles supported in their moulds M by the mould supports 40 is drawn off through the lowermost chamber C and the skirts 98 of the hot air section by the first fan 42.

When the articles supported in their moulds M have been passed through the cold air section they are capable of being handled and can be removed from the moulds prior to the moulds being brought to the clay feeding station.

Figure 4:
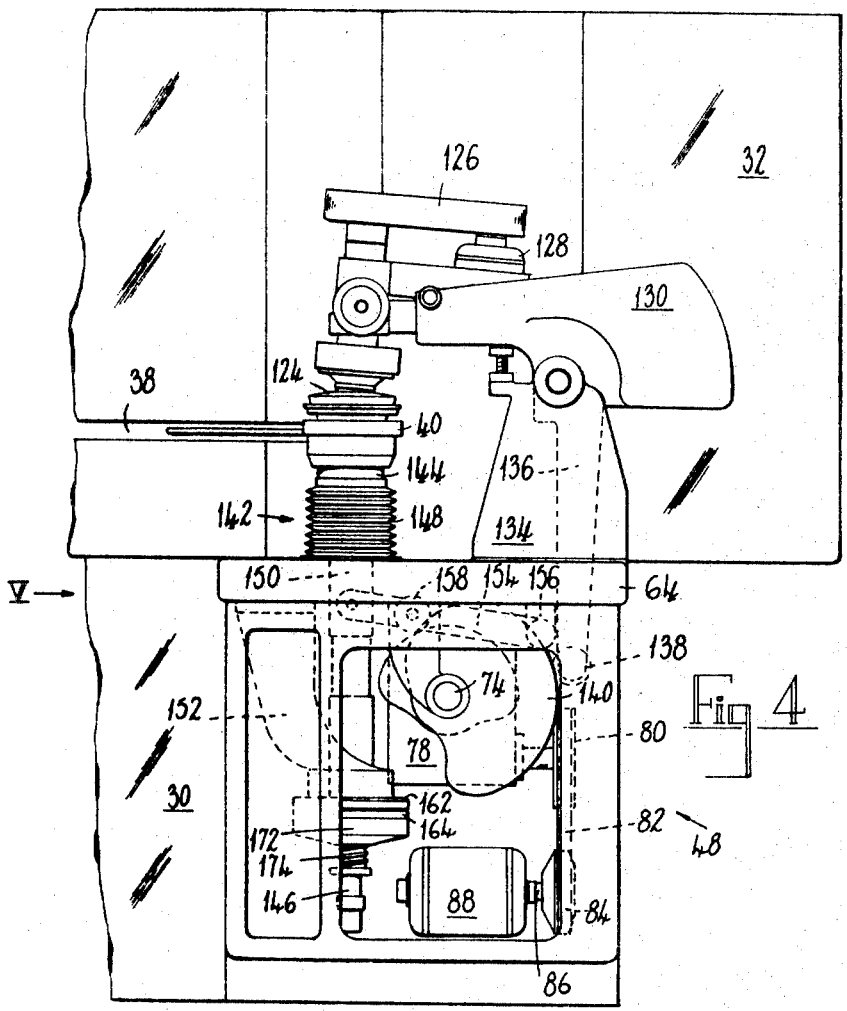
FIGURE 4 is a side view of the making machine shown in FIGURE 1.

The making machine 48 (FIGURES 4 and 5) is of the roller type and comprises a roller 124 mounted at the lower end of a spindle (not shown) driven, through a belt (not shown) arranged within a housing 126, by an electric motor 128. The roller 124 is provided with heating means (not shown). The roller 124, housing 126 and motor 128 are mounted at one end portion of a supporting arm 130 fixedly mounted for pivotal movement on a horizontal shaft 132 and provided with a counterbalance at its end portion remote from the roller, housing and motor. The horizontal shaft 132 is mounted for rotation in an upstanding bracket arrangement 134 supported on the frame 64 of the machine. Also fixedly secured on the shaft is a depending arm 136 carrying, at its lower end, a roll 138 constituting a cam follower and arranged to be held in engagement with a cam 140 secured on the main cam shaft 74 of the machine, the cam 140 being thus effective to control movement of the roller 124 into and out of operative position.

The making machine 48 also comprises a jigger head generally designated 142 and comprising a chuck 144 supported at the upper end of a hollow vertical spindle 146, the lower end portion of which is connected to a suction pump (not shown), the machine being so constructed and arranged that a mould support 40 of the turntable 36, when at the making station, is positioned directly above the chuck 144 and beneath the roller 124 of the machine. A telescopic sleeve 148 extends between the chuck 144 and the frame 64 of the machine to protect moving parts of the machine from particles of clay. The spindle 146 is supported in a sleeve member 150 supported for sliding heightwise movement in a depending bracket 152, the sleeve member 150 being received, at its upper end portion, in a bifurcated end portion of a lever 154 pivotally supported, at its other end portion, in a lug 156 depending from the frame 64 of the machine. The lever 154 carries, at an intermediate portion thereof, a roll 158 constituting a cam follower and arranged to be held in engagement with a cam 160 supported on the main cam shaft 74 of the machine, the cam 160 being arranged to cause the chuck 144 to be raised and lowered in timed relation with the movement of the roller 124 into and out of operative position.

Mounted for rotation on the bracket 152 is a clutch plate 162 which is connected, by a belt 164, with a pulley 166 mounted on a drive shaft 168 of an electric motor 170 supported on the frame of the machine. A second clutch plate 172 is supported on the lower end portion of the spindle 146 and is so arranged, when the chuck 144 is raised as aforesaid, to engage yieldably, through a spring 174, with the clutch plate 162 whereby the chuck is caused to rotate.

The making machine 48 is so constructed and arranged that the roller 124 is caused to rotate at a lesser speed than that at which the chuck 144 is caused to rotate.

The apparatus also comprises the clay feeding device 50 which may be any suitable device capable of feeding a desired amount of clay at a desired rate. If desired, however, clay may be fed to successive moulds M by hand prior to their being carried by the turntable 36 to the making machine 48.

Conveniently when the apparatus is in use, an amount of clay is fed to an empty mould M on a mould support 40 at the clay feeding station and thereafter, upon rotation of the turntable 36, the mould M is carried to the making station where it is lifted from its support by the chuck 144 and caused to rotate, the arm 130 at the same time being caused to pivot on the shaft 132 to bring the roller 124, which rotates continuously in the operation of the apparatus, into its operative position in which it operates on the clay previously fed to the mould M whereby the clay is formed to the contour of the mould, any surplus clay being removed by a scraper (not shown) mounted on the making machine 48. Thereafter the mould with its article formed therein is carried into the hot air section of the drying cabinet 34 and passes therethrough intermittently, stopping in turn beneath each of the nozzles 94 through which hot air is directed on to a surface of the article, the hot air being drawn off through the skirts 98 after it has impinged on the surface of the article as above described. After the mould has been carried through the hot air section of the drying cabinet 34 it is passed through the cold air section thereof in which cold air is directed through the nozzles 118 on to the surface of the article, the article being caused to dwell beneath each nozzle in turn as in the case of the hot air section. The article is thus cooled sufficiently when it is carried from the drying cabinet 34 to enable the operator to remove it from its mould, the mould being then returned to the clay feeding station in readiness for a further operation. It will of course be realised that whereas the operation of the apparatus has been described with reference to one mould only, thirty six moulds supported in the mould supports 40 are similarly used one after another.

Having thus described our invention, what we claim as new and desire to secure by Letters Patent of the United States is:

1. A pottery ware drying apparatus comprising a mold support, a nozzle mounted above and in close proximity with the mold support and arranged to direct hot air centrally on to a generally upwardly facing surface of an article of pottery ware supported from below, in a mold, by the mold support, a member mounted above the mold support and provided with an aperture of greater cross section than the cross section of the nozzle, the nozzle projecting through the aperture provided in the member, an air heater arrangement, and means whereby air is impelled past the air heater arrangement and thereafter through the nozzle, is caused to impinge on the surface of the article and is then drawn off through the aperture provided in the member.

2. A pottery ware drying apparatus according to claim 1 wherein the air heater arrangement is constituted by a gas burner.

3. A pottery ware drying apparatus comprising conveyor means on which is mounted a plurality of mold supports, a plurality of nozzles mounted at spaced apart intervals above the mold supports along a portion of the path of the conveyor means and arranged to direct hot air on to a surface of articles of pottery ware supported, in molds, by the mold supports, a member mounted above the mold supports and provided with at least one aperture, means whereby hot air is impelled through the nozzles, is caused to impinge on the surface of the articles and is then drawn off through the aperture or apertures provided in the member, and means for moving the conveyor means intermittently to bring each mold support beneath each of the nozzles in turn.

4. A pottery ware drying apparatus according to claim 3 wherein the means for moving the conveyor means intermittently as aforesaid includes a Geneva mechanism.

5. A pottery ware drying apparatus according to claim 3 wherein the conveyor means comprises a turntable mounted for rotation about a vertical axis and provided with a plurality of radial arms carrying the mold supports.

6. A pottery ware drying apparatus comprising a drying cabinet having at least one interior shelf member defining a plurality of chambers within the cabinet, a first one of which chambers is provided with a plurality of nozzles mounted at spaced apart intervals along a base portion thereof, and a second one of which chambers comprises a base portion in which is provided at least one aperture, a plurality of mold supports arranged beneath the nozzles, and means whereby hot air is impelled through the nozzles, which are arranged to direct the hot air on to a surface of articles of pottery ware supported, in molds, by the mold supports, is caused to impinge on the surface of the articles and is then drawn off through the aperture or apertures provided in the base of the second chamber of the drying cabinet.

7. A pottery ware drying apparatus comprising conveyor means on which is mounted a plurality of mold supports, a drying cabinet having two interior shelf members defining three chambers within the cabinet, a first, uppermost, one of which chambers is provided with a plurality of nozzles mounted at spaced apart intervals along a base portion of the first chamber and arranged to direct hot air on to a surface of articles of pottery ware supported, in molds, by the mold supports, a second, intermediate, one of which chambers comprises a base portion in which is provided at least one aperture, and through a third, lowermost, one of which chambers the mold supports are caused to move intermittently, means whereby hot air is impelled through the nozzles, is caused to impinge on the surface of the articles and is then drawn off through the aperture or apertures provided in the base portion of the second chamber of the drying cabinet, and means for moving the conveyor means intermittently whereby each mold support is brought beneath each of the nozzles in turn.

8. A pottery ware drying apparatus comprising conveyor means on which is mounted a plurality of mold supports, a drying cabinet having two interior shelf members defining three chambers within the cabinet, a first, uppermost, one of which chambers is provided with a plurality of nozzles mounted at spaced apart intervals along a base portion of the first chamber and arranged to direct hot air on to a surface of articles of pottery ware supported, in molds, by the mold supports, a second, intermediate, one of which chambers comprises a base portion in which is provided a plurality of apertures of greater cross section than the cross section of the nozzles, one of the nozzles projecting through each of the apertures, and through a third, lowermost, one of which chambers the mold supports are caused to move intermittently, an air heater arrangement, means whereby air is impelled past the air heater arrangement and thereafter through the nozzles, is caused to impinge on the surface of the articles and is then drawn off through the apertures provided in the base portion of the second chamber of the drying cabinet, and means for moving the conveyor means intermittently whereby each mold support is brought beneath each of the nozzles in turn.

9. A pottery ware drying apparatus according to claim 8 wherein the means whereby air is impelled past the air heater arrangement and thereafter through the nozzles, is caused to impinge on the surface of the articles and is then drawn off through the apertures provided in the base portion of the second chamber of the drying cabinet, comprises a fan and a fan housing having an outlet connected with the first chamber of the drying cabinet and an intake connected with the second chamber of the drying cabinet.

10. A pottery ware drying apparatus comprising conveyor means on which is mounted a plurality of mold supports, a drying cabinet having (i) a hot air section in which a plurality of nozzles mounted at spaced intervals above the mold supports along a portion of the path of the conveyor means are arranged to direct hot air on to a surface of articles of pottery ware supported, in molds, by the mold supports and which is provided with a member having at least one aperture and means whereby hot air is impelled through the nozzles, is caused to impinge on the surface of the articles and is then drawn off through the aperture or apertures provided in the member, and (ii) a cold air section in which a plurality of nozzles mounted at spaced apart intervals above the mold supports along another portion of the path of the conveyor means are arranged to direct cold air on to the surface of the articles and which is provided with means whereby cold air is impelled through the nozzles and is caused to impinge on the surface of the articles, and means for moving the conveyor means intermittently whereby each mold support is brought in turn beneath each of the nozzles of the hot air section of the drying cabinet and thereafter beneath each of the nozzles of the cold air section thereof.

11. A pottery ware drying apparatus according to claim 10 wherein the means whereby cold air is impelled through the nozzles of the cold air section as aforesaid includes a fan.

12. In an apparatus for the manufacture of pottery ware comprising conveyor means on which is mounted a plurality of mold supports, a plurality of nozzles mounted at spaced apart intervals above the mold supports along a portion of the path of the conveyor means and arranged to direct hot air on to a surface of articles of pottery ware supported, in molds, by the mold supports, a member mounted above the mold supports and provided with at least one aperture, and means whereby hot air is impelled through the nozzles, is caused to impinge on the surface of the articles and is then drawn off through the aperture or apertures provided in the member, (i) a making machine disposed at a making station of the apparatus and comprising a rotatable chuck, means for rotating the chuck, a forming tool in the form of a roller adapted to be heated, means for rotating the roller forming tool and means for effecting relative movement of approach and separation between the chuck and the forming tool, and (ii) means for moving the conveyor means intermittently whereby each mold support is brought first to the making station of the apparatus and thereafter beneath each of the nozzles in turn.

13. A making machine according to claim 12 wherein the roller forming tool is rotated at a speed slower than that of the chuck.

14. In an apparatus for the manufacture of pottery ware comprising conveyor means on which is mounted a plurality of mold supports, a plurality of nozzles mounted at spaced apart intervals above the mold supports along a portion of the path of the conveyor means and arranged to direct hot air on to a surface of articles of pottery ware supported, in molds, by the mold supports, a member mounted above the mold supports and provided with at least one aperture, and means whereby hot air is impelled through the nozzles, is caused to impinge on the surface of the articles and is then drawn off through the aperture or apertures provided in the member, (i) a clay feeding device disposed at a clay feeding station of the apparatus whereby an amount of clay is fed to molds supported by the mold supports, (ii) a making machine disposed at a making station of the apparatus and comprising a rotatable chuck, means for rotating the chuck, a forming tool in the form of a roller adapted to be heated, means for rotating the roller forming tool and means for effectng relative movement of approach and separation between the chuck and the forming tool, and (iii) means for moving the conveyor intermittently whereby each mold support is brought first to the clay feeding station of the apparatus, then to the making station thereof and thereafter beneath each of the nozzles in turn.

15. Apparatus for drying pottery ware in the mold in which it was formed comprising a support for the mold containing the pottery ware, a nozzle mounted in close proximity with the mold support and arranged to direct hot air centrally on to a surface of the article placed on the mold support, a member mounted adjacent the nozzle and provided with an aperture, and means whereby hot air is impelled through the nozzle to impinge on the surface of the article and is then drawn off the surface of the article through the aperture in the member such that the article is dried to a leather finish with a minimum of hot air contacting the mold located on the mold support.

16. A pottery ware drying apparatus according to claim 15 wherein the nozzle projects through the aperture provided in the member, the aperture being of greater cross section than the cross section of the nozzle.

17. A pottery ware drying apparatus according to claim 16 wherein the nozzle is cylindrical and the aperture provided in the member is provided with a depending tubular skirt portion surrounding a portion of the nozzle, the nozzle and skirt portion being arranged coaxially one with the other.

18. A method of manufacturing pottery ware which comprises the drying steps of providing a member having an aperture formed therein and a nozzle projecting through the aperture, supporting an article of pottery ware in a mold in which it has previously been formed, positioning the mold on the mold support and in close proximity to the nozzle with the article of pottery ware disposed between the mold and the nozzle, impelling heated air to the nozzle and directing the air through the nozzle to impinge on a surface of the article, and drawing the heated air as it escapes from the surface through the aperture with a minimum of hot air contacting the mold.

19. A method according to claim 18 which further includes the steps of providing another nozzle through which cold air is impelled, positioning the mold in close proximity with the other nozzle and directing cold air through the nozzle to impinge on the surface of the article to cool the article to facilitate handling thereof.

References Cited

UNITED STATES PATENTS 3,324,211   6/1967   Maurer et al. _____ 264—234

WILLIAM J. STEPHENSON, *Primary Examiner.*

U.S. Cl. X.R.

25—22; 34—217; 264—234